United States Patent
Tv (10) Patent No.: US 12,499,346 B2
(45) Date of Patent: Dec. 16, 2025

(54) MACHINE LEARNING-INFUSED ANALYSIS ENGINE

(71) Applicant: SAP SE, Walldorf (DE)

(72) Inventor: Ramalingam Tv, Calgary (CA)

(73) Assignee: SAP SE, Walldorf (DE)

( * ) Notice: Subject to any disclaimer, the term of this patent is extended or adjusted under 35 U.S.C. 154(b) by 593 days.

(21) Appl. No.: 17/988,193

(22) Filed: Nov. 16, 2022

(65) Prior Publication Data

US 2024/0160893 A1 May 16, 2024

(51) Int. Cl.
G06N 3/042 (2023.01)
G06N 3/08 (2023.01)

(52) U.S. Cl.
CPC ............... *G06N 3/042* (2023.01); *G06N 3/08* (2013.01)

(58) Field of Classification Search
CPC .......... G06N 3/042; G06N 3/08; G06N 3/045; G06N 3/088; G06N 5/01; G06N 7/01; G06N 20/10; G06N 3/09

USPC .......................................................... 706/12
See application file for complete search history.

(56) References Cited

U.S. PATENT DOCUMENTS

| | | | |
|---|---|---|---|
| 8,078,547 B2 * | 12/2011 | Joshi .................. | G06Q 10/0833 705/341 |
| 10,904,114 B2 * | 1/2021 | Thampy ................ | H04L 41/142 |
| 11,934,926 B2 * | 3/2024 | Eberlein .......... | G06Q 10/06393 |
| 2016/0165462 A1 * | 6/2016 | Tan ....................... | H04W 16/10 370/254 |
| 2019/0179861 A1 * | 6/2019 | Goldenstein ........ | G06F 16/9535 |
| 2020/0252310 A1 * | 8/2020 | Thampy ................ | G06N 20/00 |
| 2022/0126864 A1 * | 4/2022 | Moustafa ............ | B60W 60/0013 |

\* cited by examiner

*Primary Examiner* — Angelica Ruiz (74) *Attorney, Agent, or Firm* — SCHWEGMAN LUNDBERG & WOESSNER, P.A.

(57) ABSTRACT

In an example embodiment, machine learning techniques are applied to allow data analysis tools to automatically analyze data, come to conclusions about the data, make decisions based on those conclusions, and then execute those decisions, all without requiring human intervention. A complete end-to-end heavyweight engine is provided using these machine learning techniques.

20 Claims, 6 Drawing Sheets

MACHINE LEARNING-INFUSED ANALYSIS ENGINE

BACKGROUND

Data analysis is used by many different computer systems to provide relevant summaries or views of data to users, who are able to use these summaries or views to make decisions and/or perform actions. Examples of software products that perform such analysis include SAP Analytics Cloud™, SAP Business Warehouse™, SAP Enterprise Resource Planning™, and SAP S4/HANA, all from SAP SE of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

As the amount of data analyzed by data analysis tools grows, the complexity also correspondingly grows. Specifically, the wide usage of reporting solutions, models, and analyses requires significant time and effort for building and maintenance. Even despite this, these systems are not capable of actually making the decisions on how to react to the data, even if the data is segmented and classified.

In an example embodiment, machine learning techniques are applied to allow data analysis tools to automatically analyze data, come to conclusions about the data, make decisions based on those conclusions, and then execute those decisions, all without requiring human intervention. A complete end-to-end heavyweight engine is provided using these machine learning techniques. This heavyweight engine is able to be used as the only and only solution for a user without requiring any other analytical solution.

Figure 1:
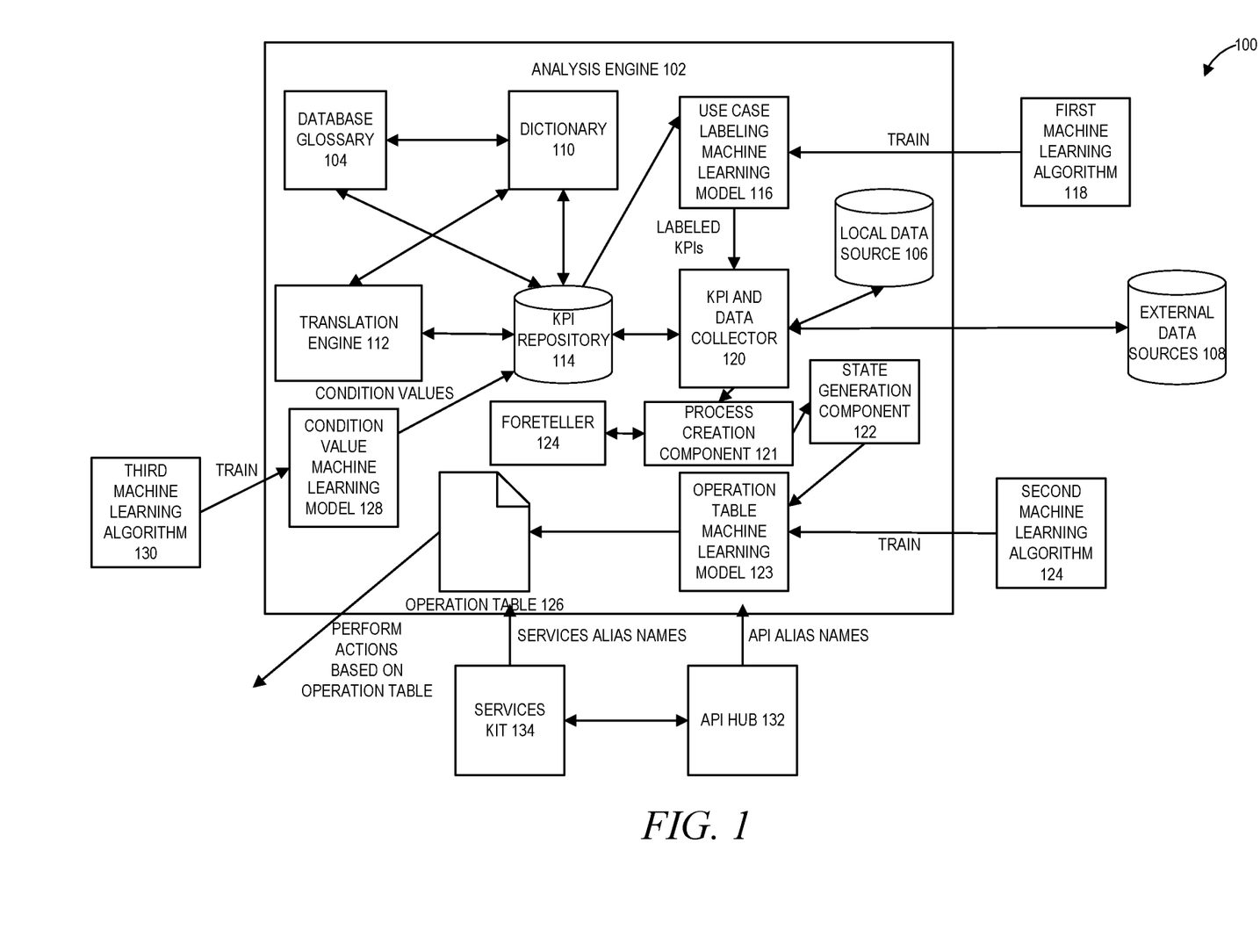
FIG. 1 is a block diagram illustrating a system, in accordance with an example embodiment.

FIG. 1 is a block diagram illustrating a system 100, in accordance with an example embodiment. More particularly, an analysis engine 102 contains a database glossary 104 that includes a list of all fields, tables, and metadata of one or more databases whose data may be analyzed during the data analysis process. This may include databases on a local data source 106 as well as databases on external data sources 108.

The analysis engine 102 further includes a dictionary 110. The dictionary 110 contains language-specific details, syntax, and semantics. The analysis engine 102 further includes a translation engine 112. The translation engine 112 is a multi-lingual dynamic system that translates each language to another language, based on the dictionary 110 and the database glossary 104.

The analysis engine 102 further includes a Key Performance Index (KPI) repository 114. A KPI is a metric used to evaluate some condition, often an operating condition of a business or unit. A KPI may be general, such as total sales income for the year for the entire company, or may be specific, such as total sales income for a particular month for one unit of the company in a particular region, or anything in between. Such KPIs are stored in the KPI repository 114 along with a condition value for each condition in the KPI. The condition value is a value that is used as a threshold for some sort of decision or action. For example, a condition value for total sales income for a particular unit of a company in a particular region may be $1 million. This means that if the total sales income for a month for this unit in this region exceeds $1 million, then a certain decision or action is taken (e.g., commission rates for salespeople in the unit are raised) while if total sales income for a month in this unit in this region does not exceed $1 million, then a different decision or action is taken (e.g., commission rates for salespeople in this unit are cut).

In some example embodiments, one or more users select the condition values for each corresponding KPI, but as will be seen later, in some instances these condition values may be learned automatically via machine learning, either completely without user intervention or with limited user intervention (e.g., the machine learning model suggesting a particular condition value for a particular KPI and the user accepting or rejecting it).

In addition to the condition value for a relevant KPI being used to aid in the decision making and/or action-taking process, each KPI may have a positive or negative label indicative of whether or not the KPI should be used as a positive use case, negative use case, or both. A positive use case is one in which an action is taken if the actual data meets or exceeds the corresponding condition value, while a negative use case is one in which an action is taken if the actual data does not meet or exceed the corresponding condition value. In the above example with respect to the $1 million condition value for total sales income for a month for a particular unit in a particular region, the KPI has both a positive use case label and a negative use case label, as actions are taken if either the total sales income for a month for the particular unit in the particular region meets/exceeds the condition value or if it does not. If, on the other hand, no action is taken if the total sales income for a month for the particular unit in the particular region meets or exceeds the condition value (e.g., commissions remain constant even if sales goals are exceeded), then this KPI will have only a negative use case label and not a positive use case label. The reverse is true if no action is taken if the total sales income for a month for the particular unit in the particular region does not meet or exceed the condition value (e.g., commissions remain constant even if sales underperform expectations), while action is taken if the total sales income for a month for the particular unit in the particular region does meet or exceed the condition value (in that case, this KPI will only have a positive use case label and not a negative use case label).

In an example embodiment, the positive use case labels and negative use case labels are assigned automatically by a use case labeling machine learning model 116. More particularly, the use case labeling machine learning model 116 is trained by a first machine learning algorithm 118 to take KPIs and corresponding condition values from the KPI repository 114 and add positive or negative use case labels (or both) to each KPI. The set of labeled KPIs are then passed to a KPI and data collector 120.

In an example embodiment, the first machine learning algorithm 118 may iterate among various weights (which are the parameters) that will be multiplied by various input variables and evaluate a loss function at each iteration, until the loss function is minimized, at which stage the weights/parameters for that stage are learned. The training data may include manually labeled data, and in particular other KPIs which have been labeled as positive and/or negative use cases. Specifically, the weights are multiplied by the input variables as part of a weighted sum operation, and the weighted sum operation is used by the loss function.

In some example embodiments, the training of the use case labeling machine learning model 116 may take place as a dedicated training phase where, for example, historical KPIs are labeled by users and fed to the first machine learning algorithm 118 to train the use case labeling machine learning model 116. In other example embodiments, the use case labeling machine learning model 116 may be retrained dynamically at runtime by the user inputting positive and/or negative use case labels to particular KPIs in real-time, and these positive and/or negative use case labels may be fed to the first machine learning algorithm 118. Alternatively, the user can provide live feedback of positive and/or negative use case labels recommended by the use case labeling machine learning model 116 (such as if such recommendations are presented to the user in a graphical user interface and the user has the ability to accept or reject the recommendations). This live feedback may then be used by the first machine learning algorithm 118 to retrain the use case labeling machine learning model 116.

The first machine learning algorithm 118 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The KPI and data collector 120 acts to obtain the condition values for any KPIs with positive use case labels and/or negative use case labels, and to retrieve (and optionally translate and/or transform) data values used to evaluate the KPIs, from the local data source 106 and/or the external data sources 108. In an example embodiment, this process is continuously or periodically performed, so that the data values are continuously or at least periodically updated automatically. It is important to note that the data values retrieved from the local data source 106 and/or external data sources 108 are not the same as the condition data values, which are stored in the KPI repository 114. Rather, the data values retrieved from the local data source 106 and/or external data sources 108 are the actual live values being tracked for performance. Thus, for example, while the condition value for a KPI involving sales income may be $1 million, the actual sales value may be $1.2 million, and it is this actual sales value that would constitute the data value for the KPI obtained from the local data source 106 and/or external data sources 108.

The KPI and data collector sends the collected data, positive and negative use case labeled KPIs, and condition values to process creation component 121, which creates a process based on this information. The process defines various operations to be performed. A state generation component 122 then generates three states for each process, a past state, a current state, and a future state, in real-time dynamically. An operation table machine learning model 123 is trained by a second machine learning algorithm 124 to populate an operation table 126. The operation table 126 will be used to automatically execute actions.

More particularly, the operation table 126 will contain the positive and/or negatively labeled KPIs and, for each positive and/or negatively labeled KPI, the corresponding condition values, resources, operations, objectives, and application program interfaces (APIs). In this context, the term "resources" refers to resources that are needed to performing corresponding actions. For example, an action for a particular API may require first that one or more stakeholders relating to a particular action be identified using a responsible, accountable, consulted, and informed (RACI) chart. The RACI chart may therefore be listed as a resource for that particular KPI.

In this context, the term "objectives" refers to what the system 100 should do during the operation. Examples of objectives include sending an email, modifying a contract, etc.

In this context, the term "APIs" refers to the APIs of the software products or components that are needed to perform the operations and achieve the objectives. For example, if sending an email is an objective, then an email service API will be needed.

In some example embodiments, a foreteller 125 is provided. The foreteller 125 is a set of libraries (including, but not limited to, an R language library), analysis and predictive models/algorithms that facilitate the process creation and rationalize the evolution of the three states in the state generation component 122.

In an example embodiment, the second machine learning algorithm 124 may iterate among various weights (which are the parameters) that will be multiplied by various input variables and evaluate a loss function at each iteration, until the loss function is minimized, at which stage the weights/parameters for that stage are learned. The training data may include manually labeled data, and in particular other positive and/or negatively labeled KPIs, data, and condition values to which resources, operations, objectives, and APIs have been assigned. These assignments may constitute the labels for the training. Specifically, the weights are multiplied by the input variables as part of a weighted sum operation, and the weighted sum operation is used by the loss function.

In an example embodiment, the training of the operation table machine learning model is rigorously performed based on the combination of all possible patterns/logics, KPIs, resources, and objectives. The KPIs may be dynamically populated in the operation table and supported by the calculations made by the operation table machine learning model.

In some example embodiments, the training of the operation table machine learning model 123 may take place as a dedicated training phase where, for example, historical positively and/or negatively labeled KPIs, data, and condition values to which resources, operations, objectives, and APIs have been assigned. These assignments may constitute the labels for the training. In other example embodiments, the operation table machine learning model 123 may be retrained dynamically at runtime by the user providing live feedback.

The second machine learning algorithm 124 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In some example embodiments, some of the training data for the second machine learning algorithm 124 can include past usage data. Specifically, which operations a human user executes in response to being presented with views of data that includes the positively and/or negatively labeled KPIs can be tracked, and these operations can be used as labels for the training data.

As mentioned briefly earlier, in some example embodiments, the condition values in the KPI repository 114 are manually entered by one or more users. In other example embodiments, however, a condition value machine learning model 128 is used to populate the condition values in the KPI repository 114. More particularly, the condition value machine learning model 128 may be trained by a third machine learning algorithm 130 based on training data that includes KPIs and condition values, with the condition values being used as the labels for the condition value machine learning model 128 to learn to predict a condition value for any particular KPI in the KPI repository.

In an example embodiment, the third machine learning algorithm 130 may iterate among various weights (which are the parameters) that will be multiplied by various input variables and evaluate a loss function at each iteration, until the loss function is minimized, at which stage the weights/parameters for that stage are learned.

The third machine learning algorithm 130 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

Additionally, an API hub 132 may provide API alias names to the analysis engine 102, which can enter these API alias names into the operation table. Each API alias name is an alias for a group of APIs contained in the API Hub 132 that may be called when the actions are performed based on the operation table 126. Likewise, a services kit 134 may provide services alias names to the analysis engine 102, which can enter these service alias names into the operation table. Each service alias name is an alias for a group of services contained in the services kit 134. The services kit 134 may additionally interface with the API hub 132 to ensure that the services and APIs, and their respective aliases, are consistent.

It should also be noted that while use case labeling machine learning model 116, operation table machine learning model 123, and condition value machine learning model 128 are depicted here as three distinct machine learning models, in some example embodiments one or more of them may be combined with each other and operated as combination models rather than distinct models. The functioning of each of the models remains the same, but they operate as sub-models within a larger overarching model architecture.

Figure 2:
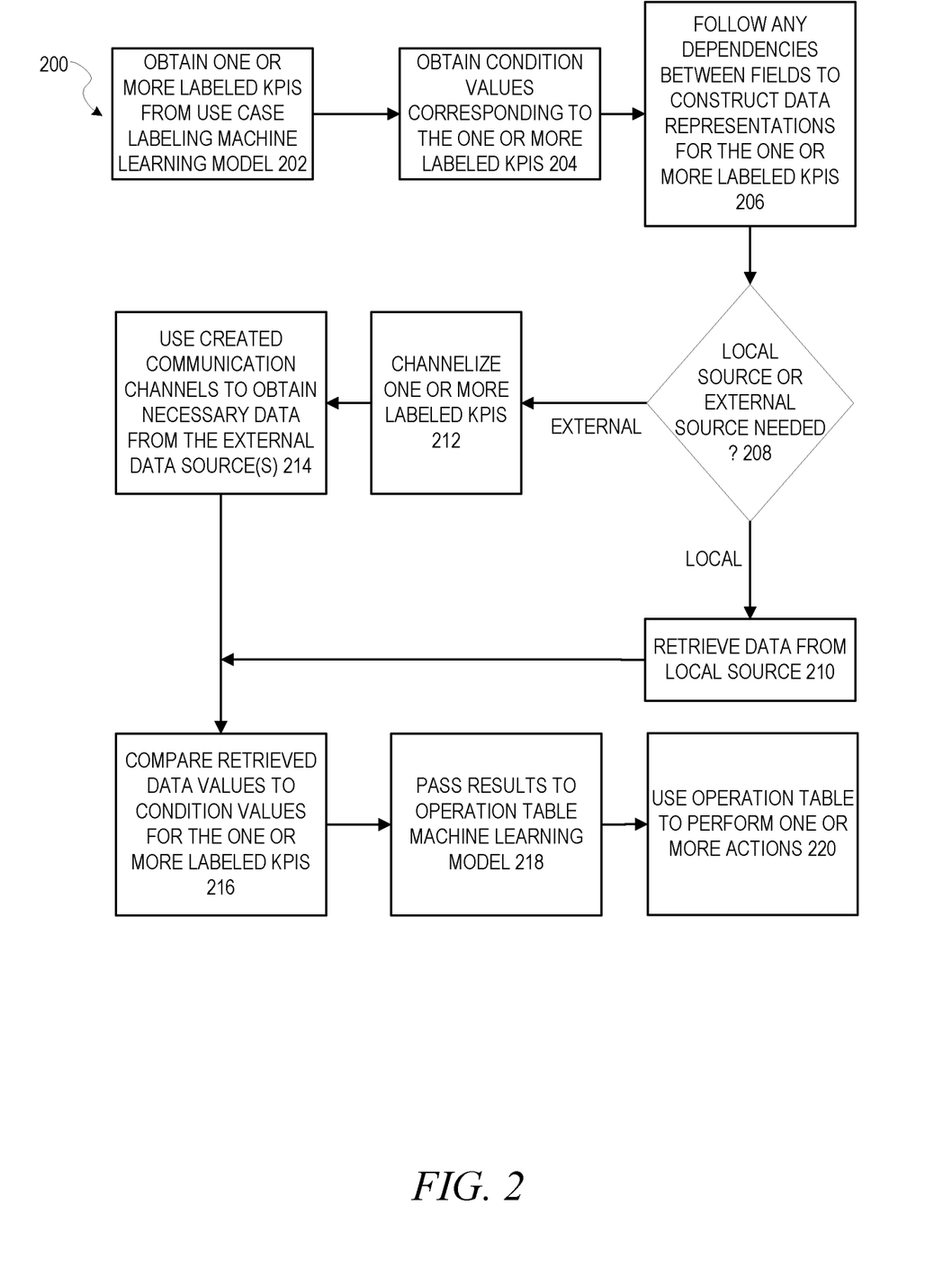
FIG. 2 is a flow diagram illustrating a method for collecting Key Performance Indices (KPIs) and corresponding data, in accordance with an example embodiment.

FIG. 2 is a flow diagram illustrating a method 200 for collecting KPIs and corresponding data, in accordance with an example embodiment. The method 200 may be performed by, for example, the KPI and data collector 120 from FIG. 1. At operation 202, one or more labeled KPIs are obtained from the use case labeling machine learning model 116. The one or more labeled KPIs each include positive and/or negative use case labels that were applied by the use case labeling machine learning model. At operation 204, condition values corresponding to the one or more labeled KPIs are obtained from the KPI repository 114. As mentioned earlier, these condition values may have been entered directly by a user, or may have been populated by a condition value machine learning model 128.

At operation 206, any dependencies between fields are followed to construct data representations for the KPIs. This involves identifying metadata of each field and seeing if the metadata identifies any dependencies. Notably, it is possible that some of these dependencies span across multiple data sources.

Figure 3:
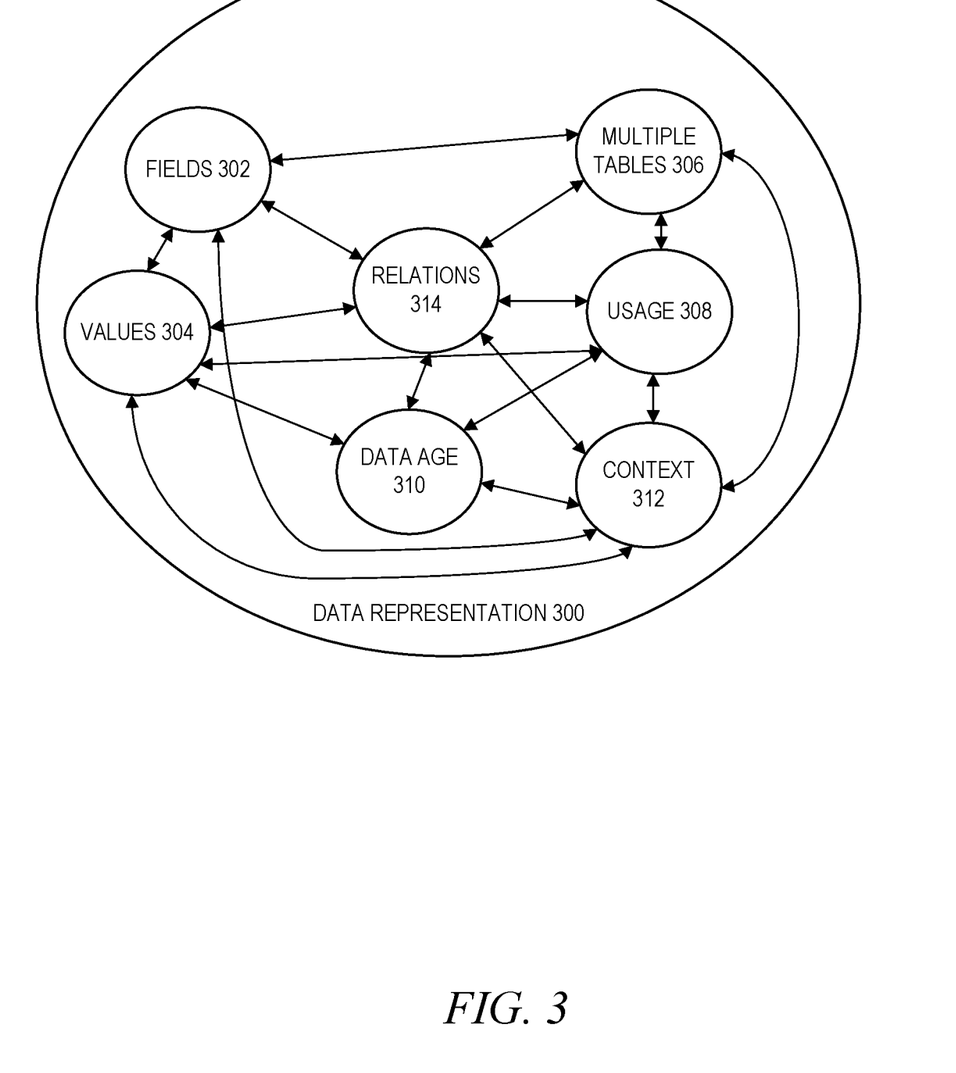
FIG. 3 is an example of a data representation, in accordance with an example embodiment.

FIG. 3 is an example of a data representation 300, in accordance with an example embodiment. Here, the data representation 300 includes fields 302, values 304 for those fields 302, multiple tables 306, usage information 308, data age 310, and data context 312, as well as the relations 314 among them. Usage information 308 may include, for example, how many times does a particular table get used, what are the timestamps of that usage, and how is the data used. Data age 310 may be relevant in that the operation table machine learning model 123 may learn to ignore older data, as its relevance may be diminished or minimal. Additionally, data context 312 may also be considered an important feature for the operation table machine learning model 123 to consider, in that particular data can be interpreted differently based on the context. Total sales by a particular employee, for example, has a completely different relevance than total sales by a company.

Referring back to FIG. 2, at operation 208, it is determined whether the local data source 106 or an external data source 108 is needed to obtain current values for the labeled KPIs, based on the data representations. In the case where data needs to be retrieved from local data source 106, at operation 210 such data is retrieved from the local data source. In cases where data needs to be retrieved from an external data source 108, then at operation 212 the labeled KPIs are channelized. This involves creating a communication channel to each external data source 108 needed to fill in data for the labeled KPIs. Then, at operation 214, the created communication channels are used to obtain the necessary data from the external data source 108 (and other external data sources, if necessary).

At operation 216, the retrieved data values (whether directly or via dependencies) are compared to the condition values for the labeled KPIs. The results of these comparisons are then passed at operation 218 to the operation table machine learning model 123, which will output a completed operation table, including all the components described above with respect to the operation table. At operation 220, the operation table is then used to automatically perform one or more actions.

In an example embodiment, the operation table will include fields for the labeled KPIs and retrieved data values, which were dynamically added via the operation table machine learning model 123, but also will include fields for services, resources, objectives, and APIs. Values for the services field could include, for example, email or document. Values for the resources field could include for example, contracts, agreements, RACI, or web holders. Values for the objectives field could include, for example, "send an email," or "recipient to list." Values for the API field could include, for example, alias names for the list of complete set of APIs residing in the API hub.

In a further example embodiment, the priority of resources may be considered as well. This priority may be stored in a separate table than the operation table, but generally can indicate a priority or precedence of each resource. This may be expressed, for example, in an ordered list where the resource with the highest priority is at the front of the list and the resource with the lowest priority is at the bottom of the list. In some instances, resources may share the same priority level and not have priority over the other resources at the same priority level.

Figure 4:
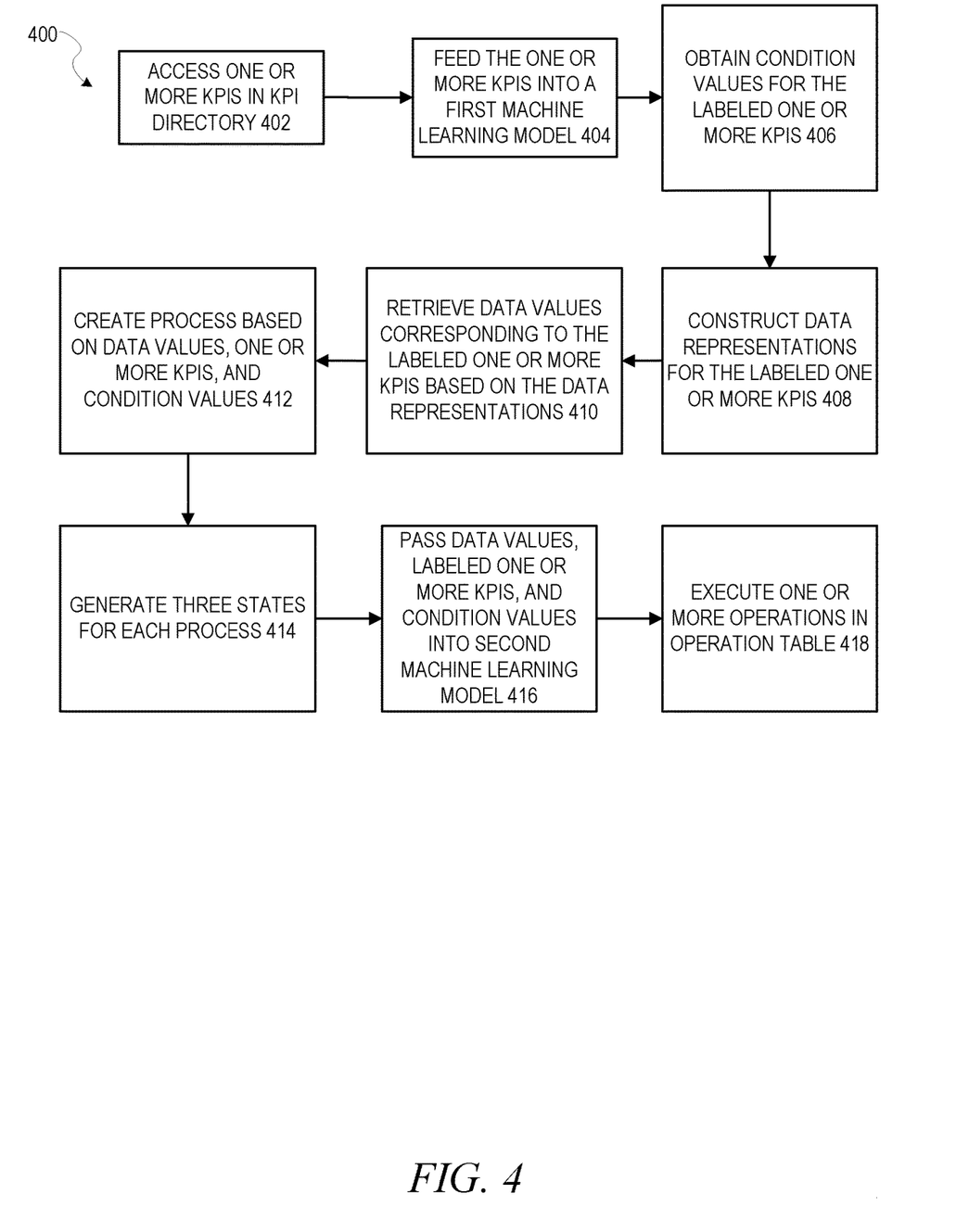
FIG. 4 is a flow diagram illustrating a method, in accordance with an example embodiment.

FIG. 4 is a flow diagram illustrating a method 400, in accordance with an example embodiment. At operation 402, one or more KPIs in a KPI repository are accessed. At operation 404, the one or more KPIs are fed into a first machine learning model, the first machine learning model adding a positive and/or negative use case label to one or more of the one or more KPIs. At operation 406, condition values are obtained for the labeled one or more KPIs from the KPI repository. At operation 408, based on the labeled one or more KPIs, the condition values, and dependencies among fields in the labeled one or more KPIs, data representations are constructed for the labeled one or more KPIs.

At operation 410, data values corresponding to the labeled one or more KPIs are retrieved from one or more sources based on the data representations. At operation 412, one or more processes are created based on the data values, one or more KPIs, and condition values. At operation 414, three states are generated for each process (past, current, and future). At operation 416, the data values, the labeled one or more KPIs, and the condition values are passed into a second machine learning model, the second machine learning model constructing an operation table based on the data values, the labeled one or more KPIs, and the condition values. At operation 418, one or more operations in the operation table are executed.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
accessing one or more key performance indices (KPIs) in a KPI repository;
feeding the one or more KPIs into a first machine learning model, the first machine learning model adding a first and/or second use case label to one or more of the one or more KPIs, a first use case label indicative of a first action to be performed if data values for a corresponding KPI transgress a condition value for the corresponding KPI, a second use case label indicative of a second action to be performed if data values for the corresponding KPI do not transgress the condition value for the corresponding KPI;

obtaining condition values for the labeled one or more KPIs from the KPI repository;
based on the labeled one or more KPIs, the condition values, and dependencies among fields in the labeled one or more KPIs, constructing data representations for the labeled one or more KPIs;
retrieving data values corresponding to the labeled one or more KPIs from one or more sources based on the data representations;
providing the data values, the labeled one or more KPIs, and the condition values to a second machine learning model, the second machine learning model constructing an operation table based on the data values, the labeled one or more KPIs, and the condition values; and
executing one or more operations in the operation table.

Example 2. The system of Example 1, wherein the operation table includes the labeled one or more KPIs, corresponding condition values, one or more resources for each of the labeled one or more KPIs, one or more objectives, one or more operations for each of the objectives, and one or more application program interfaces for each operation.

Example 3. The system of Examples 1 or 2, wherein the one or more condition values are input by a user.

Example 4. The system of any of Examples 1-3, wherein the one or more condition values are output by a third machine learning model.

Example 5. The system of any of Examples 1-4, wherein the first machine learning model is trained by passing historical KPI data along with corresponding first and/or second use case labels to a first machine learning algorithm, which iterates among various weights applied to features of the historical KPI data and evaluates a loss function, until the loss function is minimized.

Example 6. The system of Example 5, wherein the first machine learning algorithm is a neural network.

Example 7. The system of any of Examples 1-6, wherein the second machine learning model is trained by passing first and/or second use case labeled KPIs, data values, and condition values to which resources, operations, objectives, and APIs have been assigned into a second machine learning algorithm, with the resources, operations, objectives, and APIs acting as labels.

Example 8. A method comprising:
accessing one or more key performance indices (KPIs) in a KPI repository;
feeding the one or more KPIs into a first machine learning model, the first machine learning model adding a first and/or second use case label to one or more of the one or more KPIs, a first use case label indicative of a first action to be performed if data values for a corresponding KPI transgress a condition value for the corresponding KPI, a second use case label indicative of a second action to be performed if data values for the corresponding KPI do not transgress the condition value for the corresponding KPI;
obtaining condition values for the labeled one or more KPIs from the KPI repository;
based on the labeled one or more KPIs, the condition values, and dependencies among fields in the labeled one or more KPIs, constructing data representations for the labeled one or more KPIs;
retrieving data values corresponding to the labeled one or more KPIs from one or more sources based on the data representations;
providing the data values, the labeled one or more KPIs, and the condition values to a second machine learning model, the second machine learning model constructing an operation table based on the data values, the labeled one or more KPIs, and the condition values; and executing one or more operations in the operation table.

Example 9. The method of Example 8, wherein the operation table includes the labeled one or more KPIs, corresponding condition values, one or more resources for each of the labeled one or more KPIs, one or more objectives, one or more operations for each of the objectives, and one or more application program interfaces for each operation.

Example 10. The method of Examples 8 or 9, wherein the one or more condition values are input by a user.

Example 11. The method of any of Examples 8-10, wherein the one or more condition values are output by a third machine learning model.

Example 12. The method of any of Examples 8-11, wherein the first machine learning model is trained by passing historical KPI data along with corresponding first and/or second use case labels to a first machine learning algorithm, which iterates among various weights applied to features of the historical KPI data and evaluates a loss function, until the loss function is minimized.

Example 13. The method of Example 12, wherein the first machine learning algorithm is a neural network.

Example 14. The method of any of Examples 8-13, wherein the second machine learning model is trained by passing first and/or second use case labeled KPIs, data values, and condition values to which resources, operations, objectives and APIs have been assigned into a second machine learning algorithm, with the resources, operations, objectives, and APIs acting as labels.

Example 15. A non-transitory machine-readable medium storing instructions which, when executed by one or more processors, cause the one or more processors to perform operations comprising:
  accessing one or more key performance indices (KPIs) in a KPI repository;
  feeding the one or more KPIs into a first machine learning model, the first machine learning model adding a first and/or second use case label to one or more of the one or more KPIs, a first use case label indicative of a first action to be performed if data values for a corresponding KPI transgress a condition value for the corresponding KPI, a second use case label indicative of a second action to be performed if data values for the corresponding KPI do not transgress the condition value for the corresponding KPI;
  obtaining condition values for the labeled one or more KPIs from the KPI repository;
  based on the labeled one or more KPIs, the condition values, and dependencies among fields in the labeled one or more KPIs, constructing data representations for the labeled one or more KPIs;
  retrieving data values corresponding to the labeled one or more KPIs from one or more sources based on the data representations;
  providing the data values, the labeled one or more KPIs, and the condition values to a second machine learning model, the second machine learning model constructing an operation table based on the data values, the labeled one or more KPIs, and the condition values; and
  executing one or more operations in the operation table.

Example 16. The non-transitory machine-readable medium of Example 15, wherein the operation table includes the labeled one or more KPIs, corresponding condition values, one or more resources for each of the labeled one or more KPIs, one or more objectives, one or more operations for each of the objectives, and one or more application program interfaces for each operation.

Example 17. The non-transitory machine-readable medium of any of Examples 15 or 16, wherein the one or more condition values are input by a user.

Example 18. The non-transitory machine-readable medium of any of Examples 15-17, wherein the one or more condition values are output by a third machine learning model.

Example 19. The non-transitory machine-readable medium of any of Examples 15-18, wherein the first machine learning model is trained by passing historical KPI data along with corresponding first and/or second use case labels to a first machine learning algorithm, which iterates among various weights applied to features of the historical KPI data and evaluates a loss function, until the loss function is minimized.

Example 20. The non-transitory machine-readable medium of Example 19, wherein the first machine learning algorithm is a neural network.

Figure 5:
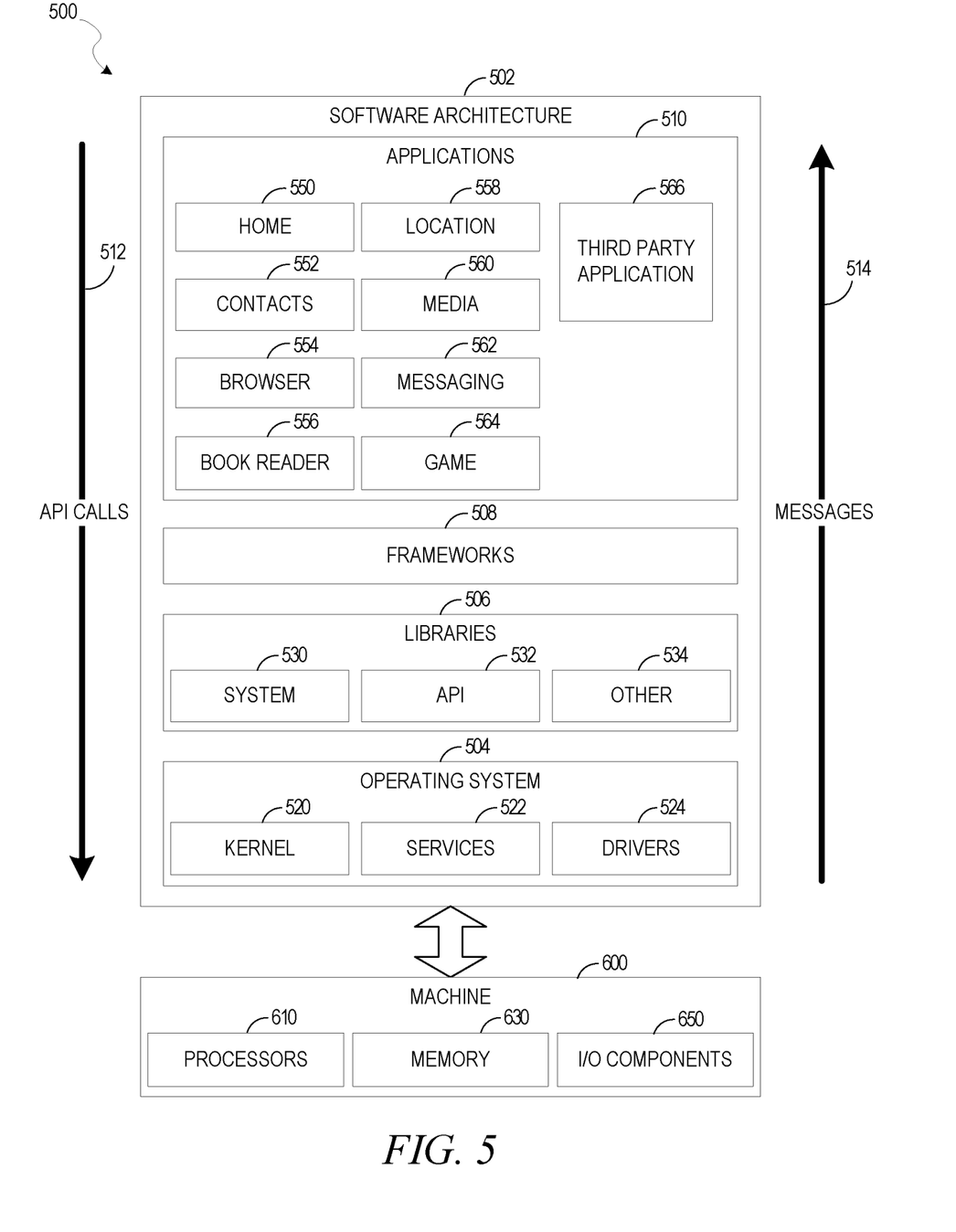
FIG. 5 is a block diagram illustrating a software architecture, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke Application Program Interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. The applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 566 can invoke the API calls 512 provided by the operating system 504 to facilitate functionality described herein.

Figure 6:
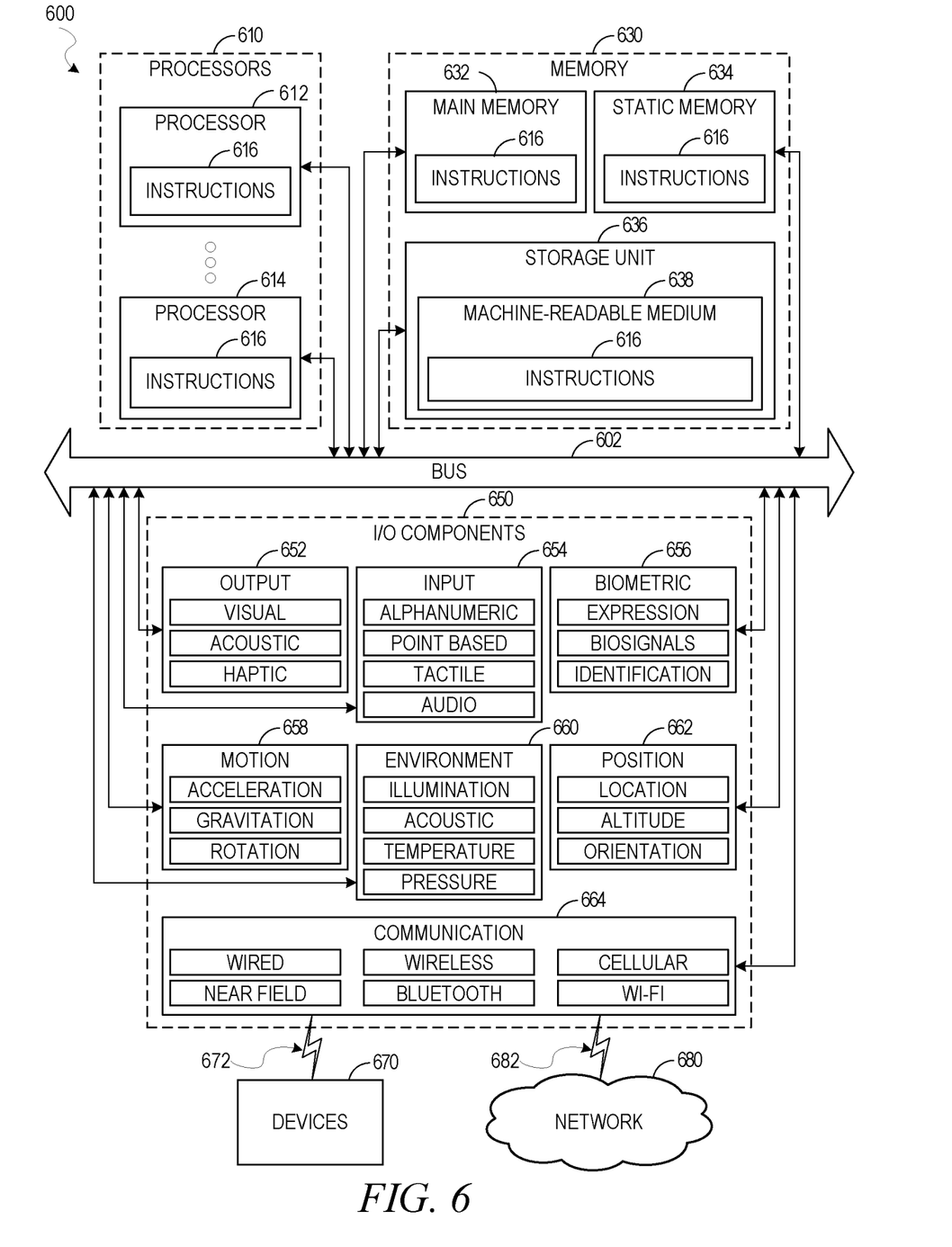
FIG. 6 illustrates a diagrammatic representation of a machine in the form of a computer system within which a set of instructions may be executed for causing the machine to perform any one or more of the methodologies discussed herein.

FIG. 6 illustrates a diagrammatic representation of a machine 600 in the form of a computer system within which a set of instructions may be executed for causing the machine 600 to perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing one or more key performance indices (KPIs) in a KPI repository;
   feeding the one or more KPIs into a first machine learning model, the first machine learning model generating an indication whether, for each KPI in the one or more KPIs, a first action is to be performed if data values for a corresponding KPI transgress a condition value for the corresponding KPI or a second action should be performed if data values for the corresponding KPI do not transgress the condition value for the corresponding KPI, or both;
   obtaining condition values for the one or more KPIs from the KPI repository;
   based on the one or more KPIs, the condition values, and dependencies among fields in the one or more KPIs, constructing data representations for the one or more KPIs;
   retrieving data values corresponding to the one or more KPIs from one or more sources based on the data representations;
   providing the data values, the one or more KPIs, the indications for the one or more KPIs generated by the first machine learning model, and the condition values to a second machine learning model, the second machine learning model constructing an operation table based on the data values, the one or more KPIs, the indications, and the condition values, the operation table containing the first action, the second action, or both the first action and the second action; and
   executing one or more operations in the operation table.

2. The system of claim 1, wherein the operation table includes the one or more KPIs, corresponding condition values, one or more resources for each of the one or more KPIs, one or more objectives, one or more operations for each of the objectives, and one or more application program interfaces for each operation.

3. The system of claim 1, wherein the one or more condition values are input by a user.

4. The system of claim 1, wherein the one or more condition values are output by a third machine learning model.

5. The system of claim 1, wherein the first machine learning model is trained by passing historical KPI data along with corresponding first and/or second use case labels to a first machine learning algorithm, which iterates among various weights applied to features of the historical KPI data and evaluates a loss function, until the loss function is minimized.

6. The system of claim 5, wherein the first machine learning algorithm is a neural network.

7. The system of claim 1, wherein the second machine learning model is trained by passing first and/or second use case KPIs, data values, and condition values to which resources, operations, objectives, and APIs have been assigned into a second machine learning algorithm, with the resources, operations, objectives, and APIs acting as labels.

8. A method comprising:
   accessing one or more key performance indices (KPIs) in a KPI repository;
   feeding the one or more KPIs into a first machine learning model, the first machine learning model generating an indication whether, for each KPI in the one or more KPIs, a first action is to be performed if data values for a corresponding KPI transgress a condition value for the corresponding KPI or a second action should be performed if data values for the corresponding KPI do not transgress the condition value for the corresponding KPI, or both;
   obtaining condition values for the one or more KPIs from the KPI repository;
   based on the one or more KPIs, the condition values, and dependencies among fields in the one or more KPIs, constructing data representations for the one or more KPIs;
   retrieving data values corresponding to the one or more KPIs from one or more sources based on the data representations;
   providing the data values, the one or more KPIs, the indications for the one or more KPIs generated by the first machine learning model, and the condition values to a second machine learning model, the second machine learning model constructing an operation table based on the data values, the one or more KPIs, the indications, and the condition values, the operation table containing the first action, the second action, or both the first action and the second action; and
   executing one or more operations in the operation table.

9. The method of claim 8, wherein the operation table includes the one or more KPIs, corresponding condition values, one or more resources for each of the one or more KPIs, one or more objectives, one or more operations for each of the objectives, and one or more application program interfaces for each operation.

10. The method of claim 8, wherein the one or more condition values are input by a user.

11. The method of claim 8, wherein the one or more condition values are output by a third machine learning model.

12. The method of claim 8, wherein the first machine learning model is trained by passing historical KPI data along with corresponding first and/or second use case labels to a first machine learning algorithm, which iterates among various weights applied to features of the historical KPI data and evaluates a loss function, until the loss function is minimized.

13. The method of claim 12, wherein the first machine learning algorithm is a neural network.

14. The method of claim 8, wherein the second machine learning model is trained by passing first and/or second use case KPIs, data values, and condition values to which resources, operations, objectives, and APIs have been assigned into a second machine learning algorithm, with the resources, operations, objectives, and APIs acting as labels.

15. A non-transitory machine-readable medium storing instructions which, when executed by one or more processors, cause the one or more processors to perform operations comprising:
- accessing one or more key performance indices (KPIs) in a KPI repository;
- feeding the one or more KPIs into a first machine learning model, the first machine learning model generating an indication whether, for each KPI in the one or more KPIs, a first action is to be performed if data values for a corresponding KPI transgress a condition value for the corresponding KPI or a second action should be performed if data values for the corresponding KPI do not transgress the condition value for the corresponding KPI, or both;
- obtaining condition values for the one or more KPIs from the KPI repository;
- based on the one or more KPIs, the condition values, and dependencies among fields in the one or more KPIs, constructing data representations for the one or more KPIs;
- retrieving data values corresponding to the one or more KPIs from one or more sources based on the data representations;
- providing the data values, the one or more KPIs, the indications for the one or more KPIs generated by the first machine learning model, and the condition values to a second machine learning model, the second machine learning model constructing an operation table based on the data values, the one or more KPIs, the indications, and the condition values, the operation table containing the first action, the second action, or both the first action and the second action; and
- executing one or more operations in the operation table.

16. The non-transitory machine-readable medium of claim 15, wherein the operation table includes the one or more KPIs, corresponding condition values, one or more resources for each of the one or more KPIs, one or more objectives, one or more operations for each of the objectives, and one or more application program interfaces for each operation.

17. The non-transitory machine-readable medium of claim 15, wherein the one or more condition values are input by a user.

18. The non-transitory machine-readable medium of claim 15, wherein the one or more condition values are output by a third machine learning model.

19. The non-transitory machine-readable medium of claim 15, wherein the first machine learning model is trained by passing historical KPI data along with corresponding first and/or second use case labels to a first machine learning algorithm, which iterates among various weights applied to features of the historical KPI data and evaluates a loss function, until the loss function is minimized.

20. The non-transitory machine-readable medium of claim 19, wherein the first machine learning algorithm is a neural network.

* * * * *